United States Patent
Mauk et al.

(10) Patent No.: US 7,019,087 B2
(45) Date of Patent: Mar. 28, 2006

(54) METHOD FOR PRODUCTION OF A MOULDABLE MASS AND USE THEREOF FOR PRODUCTION OF LOW-EMISSION FLOOR COVERINGS

(75) Inventors: Hanns-Jörg Mauk, Mundelsheim (DE); Bernd Fischer, Pleidelsheim (DE); Renate Stefani, Oberriexingen (DE)

(73) Assignee: DLW Aktiengesellschaft, Bietigheim-Bissingen (DE)

( * ) Notice: Subject to any disclaimer, the term of this patent is extended or adjusted under 35 U.S.C. 154(b) by 17 days.

(21) Appl. No.: 10/486,456

(22) PCT Filed: Aug. 12, 2002

(86) PCT No.: PCT/EP02/09018

§ 371 (c)(1),
(2), (4) Date: Aug. 2, 2004

(87) PCT Pub. No.: WO03/016358

PCT Pub. Date: Feb. 27, 2003

(65) Prior Publication Data

US 2004/0249087 A1      Dec. 9, 2004

(30) Foreign Application Priority Data

Aug. 13, 2001   (DE) .................. 101 39 738

(51) Int. Cl.
*C08C 19/04*     (2006.01)
*C08F 8/06*      (2006.01)

(52) U.S. Cl. ............. 525/387; 525/191; 525/192; 525/193; 525/194

(58) Field of Classification Search .............. 525/191, 525/192, 193, 194, 387
See application file for complete search history.

(56) References Cited

U.S. PATENT DOCUMENTS

| 4,578,430 A | 3/1986 | Davison .................. 525/385 |
| 4,902,738 A * | 2/1990 | Mitsuno et al. ............ 524/525 |
| 5,405,915 A | 4/1995 | Hess et al. .................. 525/290 |
| 5,405,917 A | 4/1995 | Mueller, Jr. et al. ...... 525/333.8 |
| 5,587,434 A * | 12/1996 | McCullough et al. .... 525/333.8 |
| 5,651,927 A | 7/1997 | Auda et al. .................. 264/85 |

FOREIGN PATENT DOCUMENTS

| DE | 35 28 066 A1 | 2/1987 |
| DE | 300 301 A7 | 6/1992 |
| DE | 43 13 153 C1 | 5/1994 |
| WO | WO 99/58602 | 11/1999 |
| WO | WO 01/42401 A | 6/2001 |

OTHER PUBLICATIONS

Nov. 3, 2003 International Preliminary Examination Report for Application No. PCT/EP2002/009018, filed Aug. 12, 2002.

* cited by examiner

*Primary Examiner*—Ling-Sui Choi
(74) *Attorney, Agent, or Firm*—Womble Carlyle Sandridge & Rice, PLLC

(57) ABSTRACT

A method for the production of moldable masses is provided. The method includes compounding a polyolefin having a density of less than about 0.918 g/cm³ serial crosslinking agents. The moldable masses can be used the production of low-emission floor coverings with excellent material properties.

21 Claims, 1 Drawing Sheet

METHOD FOR PRODUCTION OF A MOULDABLE MASS AND USE THEREOF FOR PRODUCTION OF LOW-EMISSION FLOOR COVERINGS

RELATED APPLICATION

This present application is a § 371 national phase application of PCT application serial no. PCT/EP02/09018, filed on Aug. 12, 2002, and which claims priority under 35 U.S.C. §119(b) to German application serial no. 101 39 738.0-43, filed on Aug. 13, 2001. German application serial no. 101 39 738.0-43 and PCT application serial no. PCT/EP02/09018 are hereby incorporated by reference in their entireties as if fully set forth herein.

TECHNICAL FIELD

The invention at hand relates to a method for the production of low-emission floor coverings.

BACKGROUND

Elastomer coverings on rubber basis are part of high-performance floor coverings due to their durability and multiple application possibilities. However, the curing and processing additives or agents, respectively, are inclined to emit from the floor coverings in their unchanged, or their chemically changed forms. WO 97/47802 and WO 99/58602 have therefore described floor coverings, which essentially do not cause any annoying odor or health affecting emissions. Such floor coverings are based on polyolefin with a density of <0.918 g/cm$^3$ for the polymer binder. In the course of further development for low-emission floor coverings, it has been shown that the processing methods in the production of such floor coverings may have a substantial influence on their material properties.

SUMMARY

The invention at hand relates to a method for the production of moldable masses on the basis of polyolefin with a density of <0.918 g/cm$^3$ by means of at least two delayed cross-linking reactions, as well as the use of such masses for the production of low-emission floor coverings with excellent material properties.

BRIEF DESCRIPTION OF THE DRAWINGS

FIG. 1 provides a schematic illustration of a device according to this invention in which one arrangement of the enclosure of the extruder is exemplified.

Figure 1:
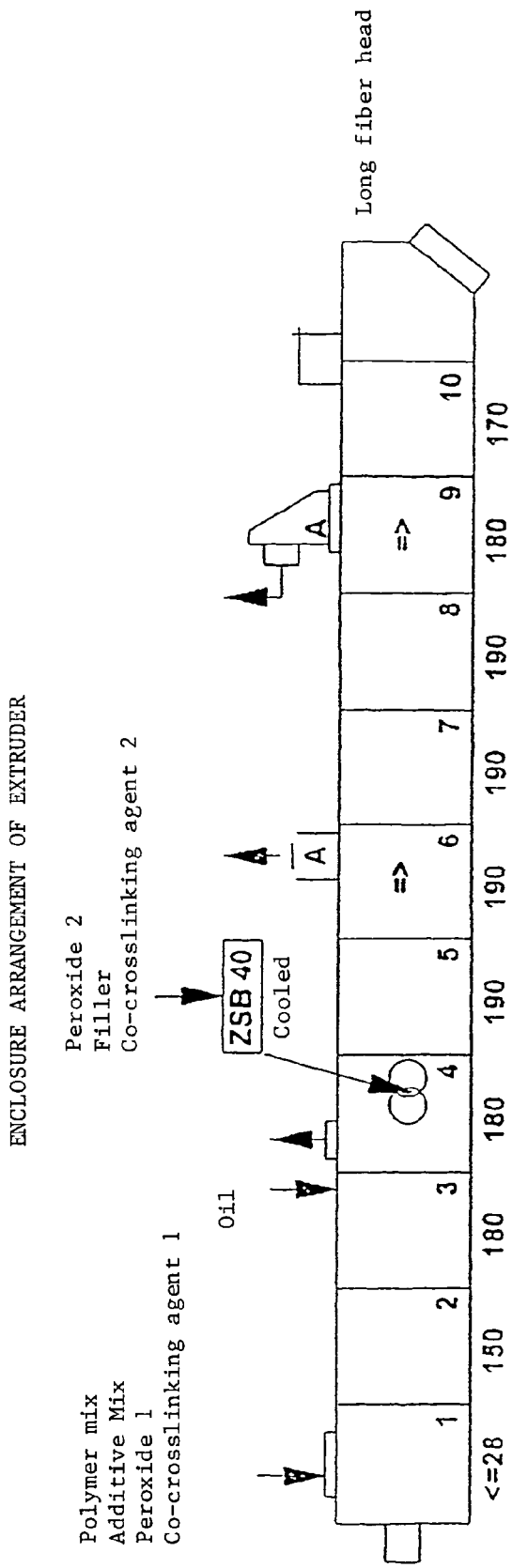
FIG. 1.

This task is solved by means of the embodiments characterized in the claims. One method in particular for production of a moldable mass is provided, which is comprised of the following steps:

(a) Compounding of a blend that contains at least one polyolefin with a density of <0.918 g/cm$^3$, for example 0.86 to 0.91 g/cm$^3$, a first organic peroxide compound, such as 2,5-dimethyl-2,5-di-(t-butylperoxy)-hexane ("DHBP"), with a decomposition temperature T1 of, for instance, approximately ≧160° C., and at a temperature of <T1, a first co-cross-linking agent, which is essentially stable at a temperature of <T1.

(b) Adding of mineral oil, preferably paraffin mineral oil with as few unsaturated proportions as possible, such as SUNPAR® 150, to the blend from step (a), preferably at a quantity of 2 to 25 weight-% based on the amount of the polyolefin, and heating of this blend to a temperature T2, such as approximately 180° C.; and (c) Adding of at least a second organic peroxide compound, such as 1,1-di-(5-butylperoxy)-3,3,5-trimethylcyclohexane, with a decomposition temperature T3 and a second co-cross-linking agent, which is essentially stable at a temperature of <T3 to the blend of step (b), and heating of the resulting blend to a temperature of ≧T3, such as to approximately ≧185° C. while maintaining the moldable mass, whereby T1<T2<T3.

The polyolefin used in step (a) can be a polyethylene of very low density ("PE-VLD"), or a copolymer from ethylene with at least one additional olefin, such as propane, butane, or octane, and/or a blend of at least two ethylene-copolymers, whereby as the main polymer, the ethylene-copolymer has a copolymer (i) with a density of 0.88–0.91 g/cm$^3$, and for controlling rheology and elasticity, a copolymer (ii) with a density of 0.86–0.89 g/cm$^3$, and an MFI of >3 (at 190° C.; 2.16 kg). For example, the copolymers (i) and (ii) are copolymers of ethylene with octane. The copolymers (i) and (ii), can be present, for instance, at a weight ratio of 4:1 to 3:2. Furthermore, as an additional component in addition to polyolefin, at least one graft polymer may be present, preferably on the basis of an HD-polyethylene. In particular, the graft polymer can be maleic acid anhydride grafted HD-polyethylene, whereby the degree of grafting is preferably 1 to 5%. The proportion of the graft polymer is, for example, 5 to 25 weight-% based on the total weight of the polymer proportions used in step (a). Accordingly, the proportion of at least one polyolefin, which in addition to the graft polymer forms the polymer proportion of the blend in step (a), can be between 75 to 95 weight percent, based on the total weight of the polymer proportions.

The first organic peroxide compound used in step (a) is not only comprised of individual compounds, but can also be comprised of a blend of at least two like peroxide compounds, provided that both the individual compounds and such a blend have a pre-determined decomposition temperature of ≧T1. For example, the decomposition temperature of the DHBP used in step (a) is ≧170° C. The first organic peroxide compound is present in the blend to be compounded; preferably at an amount of 0.05 to 2.0 weight-% based on the amount of polyolefin.

The first co-cross-linking agent used in step (a), which is essentially stable at a temperature of <T1, is preferably selected from a group consisting of di- and trimethacrylatene, such as 1,4-butanedioldimethacrylate ("1,4-BDMA"), 1,3-butanediol-dimethacrylate ("1,3-BDMA"), triethyleneglycoidimethacrylate ("TEDMA"), and trimethylolpropanetrimethacrylate ("TRIM"), and blends thereof. The Co-cross-linking agent is present in the blend to be compounded preferably at an amount of 0.05 to 4.0 weight-% based on the amount of polyolefin.

The blend to be compounded in step (a) may further contain common processing auxiliary agents, such as interior/exterior lubricants, such as from the group of waxes, such as metal salts; static inhibitors, such as GMS; antioxidants, such as phenol-inhibited amines, etc. These processing auxiliary agents are used in traditional quantities, such as 1 to 5 weight-% based on the polymer proportions.

The mineral oil added in step (b) to the blend to be compounded in step (a) should preferably be low in aromatic compounds, i.e. have no aromatic residue or group, respectively, such as a phenyl group, whereby 2 to 25 weight-% based on the amount of the polyolefin are added.

The second organic peroxide compound added in step (c) is not only comprised of individual compounds, but can also be comprised of a blend of at least two such peroxide compounds, provided that both the individual compounds and the blend have a pre-determined decomposition temperature of $\geq T3$. The second organic peroxide compound is preferably added at a quantity of 0.05 to 2.0 weight percent based on the amount of polyolefin.

The second co-cross-linking agent added in step (c), which is essentially stable at a temperature of <T3, may contain, for example, triallyl cyanurate (TAC) and/or triallyl isocyanurate (TAIC), whereby the co-cross-linking agent is added at a quantity of 0.05 to 5 weight-% based on the amount of the polyolefin.

In a preferred embodiment of the method according to the invention, the second co-cross-linking agent has an accelerating effect on the peroxidic cross-linking reaction. Especially preferred are dimethacrylate as the first co-cross-linking agent, as opposed to, for example, TRIM, because a larger amount of additive can be achieved at an equal MFI, which advantageously results in surface energy of floor coverings on the basis of the mass according to the invention by means of a higher content of polar groups.

In step (c) of the method according to the invention common fillers, such as silica flour, kaolin, talc, wood flour, dolomite, aluminumtrihydroxide, precipitated silica, barite, chalk, as well as common pigments can also be added.

The quantities of fillers and pigments used are within common ranges, and are, for example, up to 70% for fillers, and for example, up to 8% for pigments based on the total formulation.

The temperature T1 in step (a) of the method according to the invention is preferably selected so that the polyolefin used can be plasticized in addition to the compounding with the first organic peroxide compound and the Co-cross-linking agent, but no decomposition of the first organic peroxide compound due to the temperature occurs. When using for example OHBP as the first organic peroxide compound, the temperature T1 is maintained at $\leq 160°$ C., preferably between approximately 120 to 160° C., i.e. below the decomposition temperature of DHBP. At this temperature, adequate plasticizing of the blend to be compounded can be achieved.

The temperature T2 in step (b) of the method according to the invention is selected so that after adding the mineral oil, the cross-linking reaction is activated between the first organic peroxide and the co-cross-linking agent. This "main reaction" of the blend plasticized and compounded according to step (a) is performed using, for example, DHBP at approximately 180° C.

The temperature T3 in step (c) of the method according to the invention is selected so that after adding the second organic peroxide compound and the second co-cross-linking agent, the "final cross-linking" is ensured, i.e. the first and second peroxide compounds used should preferably be completely converted during the residence time in the extruder. When using, for example, 1,1-DI-(t-butylperoxy)-3,3,5-trimethylcyclohexane as the second organic peroxide compound, the temperature T3 is $\geq 185°$ C.

The temperature direction of steps (a) to (c) of the method according to the invention can be controlled or adjusted by means of extreme and/or internal reaction enclosure temperature units, and/or by means of friction initiating worm elements with the use of twin worm extruders. The time for performing steps (a) to (c) of the method according to the invention usually lasts 1 to 4 minutes. For example, with the use of a twin worm extruder, the residence time depends on the type of worm equipment and is selected so that in dependency of the throughput to be achieved, the blend remains in the enclosure for an accordingly long time, preferably for approximately 1 to three minutes.

In a preferred embodiment of the method according to the invention, degassing of the mass achieved is performed after step (c), such as atmospheric ventilation followed by vacuum ventilation.

An additional subject of the invention at hand relates to the production of floor coverings using the previously defined moldable mass. In one embodiment, the method according to the invention is comprised of providing a carrier in the shape of webs, as well as the application of the previously defined moldable mass onto one side of the carrier. Any material currently used in the floor covering sector on the basis of natural and/or synthetic woven fabric or knitted fabrics, textile material, as well as materials on the basis of non-woven materials or non-woven fabrics, may be used. For example, jute fabrics, blended fabrics made of natural fibers such as cotton and cellulose, fiber glass fabrics, fiber glass fabrics coated with bonding agents, blended fabrics made of synthetics, fabrics made of core/compound glass fiber with, for example, a core of polyester and a polyamide coating, may be used.

In another embodiment of the method according to the invention for the production of particularly homogenous floor coverings, the moldable mass created, for example, in a twin worm extruder can be processed into foil by means of a flat die and calendar stack or a roller mill. This foil can be further processed into any desired floor covering, for example, by means of sprinkling on a differently designed granulate, or continuously by means of a twin auma or twin press.

In another embodiment granulates yielded from the moldable mass, or the mill feed thereof, can be fixed to a area-measured material by means of sprinkling it on a liner in a Thermofix® system. Compression and smoothing of the product web achieved in this way occurs in an auma. The direct production of a floor covering by means of stacking of mill feed or granulate is also possible in a twin auma or twin press. As far as the production of homogenous floor coverings with directional structure is concerned, multi-colored granulates or blends of several monochrome granulates can be added into the groove of a roller mill/calendar.

An additional subject of the invention at hand is a floor covering, which can be quickly produced according to one of the previously defined methods. Surprisingly it was shown in the floor covering according to the invention that without a corona treatment an increase of surface energy can be achieved, which, among other reasons, is a cause of the use of the Co-cross-linking agents in steps (a) and (c) of the method according to the invention. For example, by using 1,3-BDMA and/or 1,4-BDMA as the first co-cross-linking agent in step (a) of the method according to the invention, the proportion of the polar groups and thereby the surface energy can be selectively increased. Due to the higher surface energy, the floor covering according to the invention has a "direct gluability" as compared to traditional olefin floor coverings. Furthermore, a ("three-dimensional") network is constructed by means of the delayed decomposition of the peroxides in steps (a) and (c) of the method according to the invention and in the related cross-linking reactions, which results in excellent material properties of the floor covering.

BRIEF DESCRIPTION OF THE DRAWINGS

The figures show the following:

FIG. 1 is a schematic illustration of a device for the production of the floor covering according to the invention (also compare example 1). The arrangement of the enclosure of the extruder is comprised of ten enclosure zones, whereby the compound blend according to step (a) is added to the enclosure zone 1, the mineral oil according to step (b) is added at the end of the enclosure zone 3, and the blend according to step (c) is added in the enclosure zone 4 by means of a twin worm feed extruder (ZSB 40) at a temperature of ≦28° C. The rear ventilation is located at the beginning of the enclosure zone 4, the atmospheric ventilation ("A") is located in the enclosure zone 6, and the vacuum ventilation ("A") is located in the enclosure zone 9. The respective enclosure temperature is stated in ° C. below each enclosure zone.

The invention at hand is explained in further detail by means of the following examples.

EXAMPLE 1

A densely combing equi-directionally rotating twin worm extruder of the type ZSK 40 from Coperion Werner+Pfleiderer with L/O=40 and D=40 is used to perform the method according to the invention (compare FIG. 1). The compound blend (compare the following formulation for step (a)) is plasticized and homogenized within a 6D long feeder zone by means of suitable conveying and kneading elements. The temperature in this case is approximately 180° C. After adding the mineral oil (SUNPAR 150®, 11.5 weight-%) the temperature is increased by means of friction and shear rates of the worm elements, and initializes the peroxidic cross-linking essentially between the first organic peroxide DHBP and the co-cross-linking agent 1,4-BDMA. The temperature is now approximately 185° C. Subsequently, the blend according to step (c) is added in the following formulation by means of a lateral extruder. Since the temperature of the mass is higher than the decomposition temperature of the second organic peroxide compound, the final cross-linking is now initiated. The temperature in this case is approximately 195° C. Before exiting the extruder, a degassing by means of atmospheric ventilation followed by vacuum ventilation is performed in order to remove any volatile reaction products as well as any volatile educts so that they will be unable to pollute the air in the future room.

Formulation for Example 1

| Raw Materials | Quantity [g] | Proportion to total formulation |
| --- | --- | --- |
| Compound blend, step (a) | | |
| Affinity PL 1880 | 375.00 | 5.68% |
| Affinity VP 8770 | 2,250.00 | 34.10% |
| Dow XU 60769.07 | 375.00 | 5.68% |
| Processing Auxiliary Agents (Additive mix) | 59.4 | 0.9% |
| 1.4-BDMA | 5.30 | 0.080% |
| Trigonox 101-50 D-Pd | 6.60 | 0.100% |
| Mineral Oil Additive, step (b) | | |
| SUNPAR 150 | 330.00 | 5.00% |

| Raw Materials | Quantity [g] | Proportion to total formulation |
| --- | --- | --- |
| Filler blend (lateral extruder), step (c) | | |
| Filler | 2,904.00 | 44.02% |
| Trigonox 29-40 B-Pd | 21.10 | 0.320% |
| Perkalink 301-50 | 4.25 | 0.064% |
| Pigment blend | 267 | 4.05% |

The following lists the properties of the floor covering produced according to the invention with the previously mentioned mass:

| 1. Indentation Behavior according to EN 433 | | |
| --- | --- | --- |
| Remaining indentation after 150 min. | mm | 0.01 |
| Thickness before load | mm | 2.34 |
| Penetration depth after 150 min. | mm | 0.13 |
| Index after 150 min. | mm | 5.6 |
| Elasticity after 150 min. | % | 92.3 |
| 2. Shore Hardness according to DIN 53 505 | Shore A | 96 |
| | Shore D | 45 |
| 3. [Illegible] Behavior according to DIN 53 516 | | |
| Raw density, EN 436 | g/cm³ | 1.335 |
| Loss of volume | mm³ | 94.5 |

Surface energy of the floor covering produced according to the invention

Testing Method

Determination of surface energy of the samples by means of contact angle measurement. Di-iodine methane (Busscher) and water (Busscher) were used as the test liquids. The analysis is performed according to Owens, Wendt, Rabel & Kaelble.

Test Results

| Sample | Surface energy [mN/m] | Disperser Proportion [mN/m] | Polar proportion [mN/m] |
| --- | --- | --- | --- |
| Elastomer Tile | 36.5 | 34.6 | 1.9 |

What is claimed is:

1. A method for the production of a moldable mass, comprising:
   (a) compounding, at a first temperature, a blend that contains at least one polyolefin with a density of less than about 0.918 g/cm³, a first organic peroxide compound with a first decomposition temperature, and a first co-cross-linking agent, wherein the first co-cross-linking agent is substantially stable at temperatures less than the first decomposition temperature;
   (b) adding of mineral oil to the compounded blend of step (a), and heating of this blend to a second temperature; and
   (c) adding of at least one second organic peroxide compound with a second decomposition temperature, and a second co-cross-linking agent, which is substantially stable at temperatures less than the second decomposition temperature to the blend of step (b), and heating of the resulting blend to a temperature of above the second decomposition temperature while yielding the moldable mass, wherein the first temperature is less than the first decomposition temperature, the first decomposition temperature is less than the second temperature and the second temperature is less than the second decomposition temperature.

2. The method according to claim 1, wherein the polyolefin is polyethylene of very low density (PE-VLD), a copolymer of ethylene with at least one additional olefin, or a blend of at least two ethylene copolymer.

3. The method according to claim 1, wherein the polyolefin has a density of about 0.86 to about 0.91 g/cm$^3$.

4. The method according to claim 1, wherein the first organic peroxide compound is 2,5-dimethyl-2,5-di-(t-butylperoxy)-hexane (DHBP).

5. The method according to claim 1, wherein the first organic peroxide compound is present at a quantity of about 0.05 to about 2.0 weight-percent based on the amount of the polyolefin.

6. The method according to claim 1, wherein the first co-cross-linking agent contains a compound selected from dimethacrylates and trimethacrylates.

7. The method according to claim 6, wherein the dimethacrylates and trimethylacrylates are selected from the group 1,4-butanedioldimethacrylate (1,4-BDMA), 1,3-butanediol-dimethacrylate (1,3-BDMA), triethyleneglycoi-dimethacrylate (TEDMA, and trimethylolpropanetrimethacrylate (TRIM).

8. The method according to claim 1, wherein the first co-cross-linking agent is present at a quantity of about 0.05 to about 4.0 weight-percent based on the amount of the polyolefin.

9. The method according to claim 1, wherein the blend in step (a) contains a processing auxiliary agent.

10. The method according to claim 1, wherein the mineral oil is added at a quantity of about 2 to about 25 weight-percent based on the amount of the polyolefin.

11. The method according to claim 1, wherein the second peroxide compound is 1,1-di-(t-butylperoxy)-2,3,5-trimethylcyclohexane.

12. The method according to claim 1, wherein the second peroxide compound is added at a quantity of about 0.05 to about 2.0 weight-percent based on the amount of the polyolefin.

13. The method according to claim 1, wherein the second co-cross-linking agent contains a compound selected from triallyl cyanurate (TAC) and triallyl isocyanurate (TAIC).

14. The method according to claim 1, wherein the second co-cross-linking agent is added at a quantity of about 0.05 to about 5.0 weight-percent based on the amount of the polyolefin.

15. The method according to claim 1, wherein step (c) further comprises adding a filler.

16. The method according to claim 1, in which the first decomposition temperature is approximately less than or equal to 160° C., the second temperature is approximately 180° C., and the second decomposition temperature is approximately less than or equal to 185° C.

17. The method according to claim 1, in which the time for performing steps (a) to (c) is approximately 1 to 3 minutes.

18. The method according to claim 1, in which degassing is performed after step (c).

19. The method according to claim 1, further comprises forming the molded mass into a floorcovering.

20. The method of claim 2, wherein the blend further comprises a graft polymer.

21. The method of claim 1, wherein step (c) further comprises adding a pigment.

* * * * *